July 3, 1962 J. DOVCI 3,042,131
INVALID'S CART
Filed May 19, 1960 4 Sheets-Sheet 1

INVENTOR.
JOHN DOVCI
BY
Kemmel & Crowell
ATTORNEYS

July 3, 1962 J. DOVCI 3,042,131
INVALID'S CART
Filed May 19, 1960 4 Sheets-Sheet 2

INVENTOR.
JOHN DOVCI
BY
Kimmel & Crowell
ATTORNEYS

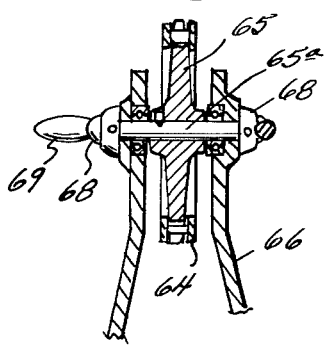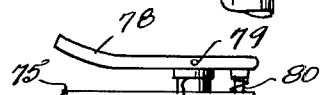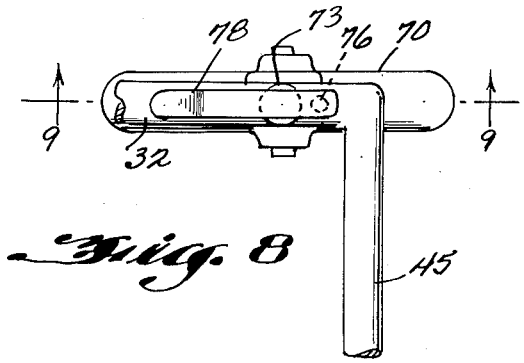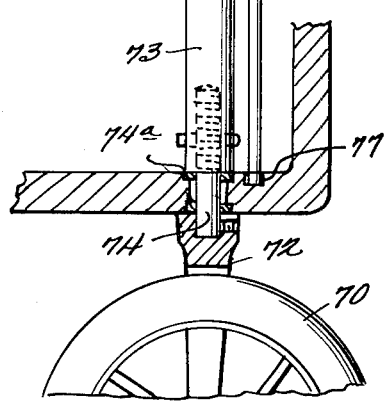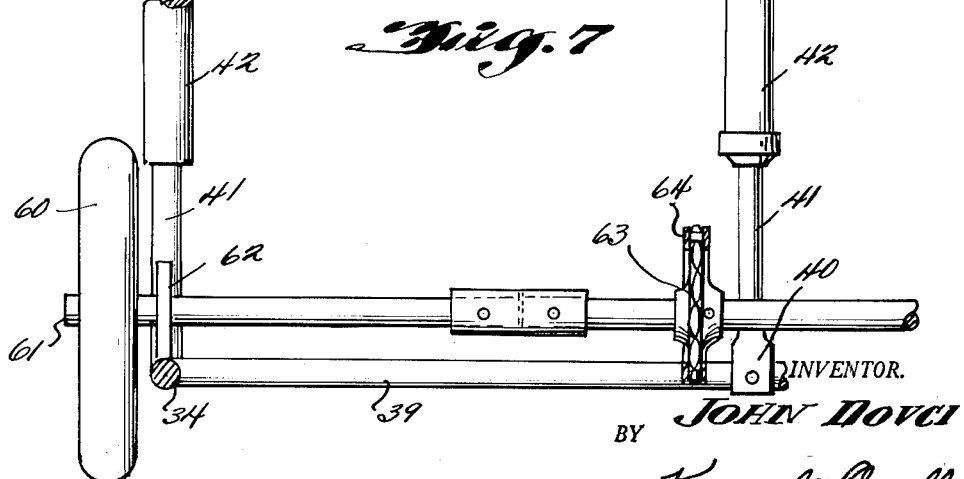

July 3, 1962
J. DOVCI
3,042,131
INVALID'S CART
Filed May 19, 1960
4 Sheets-Sheet 4
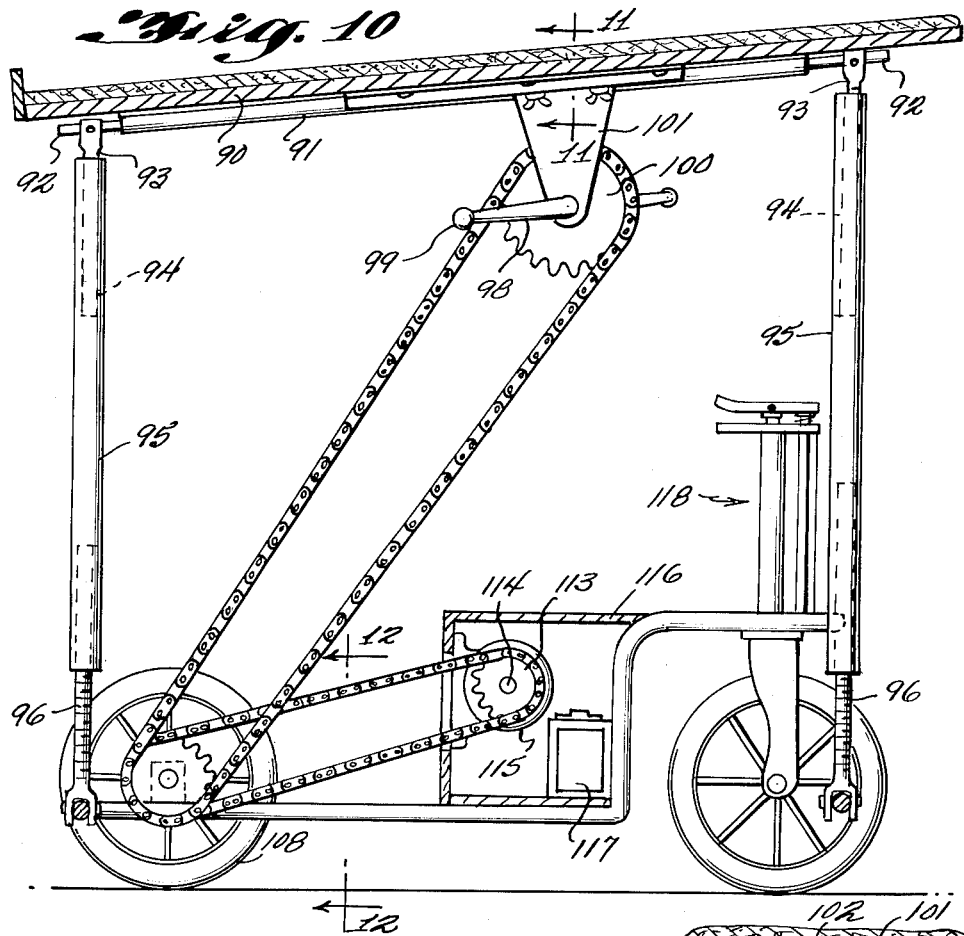
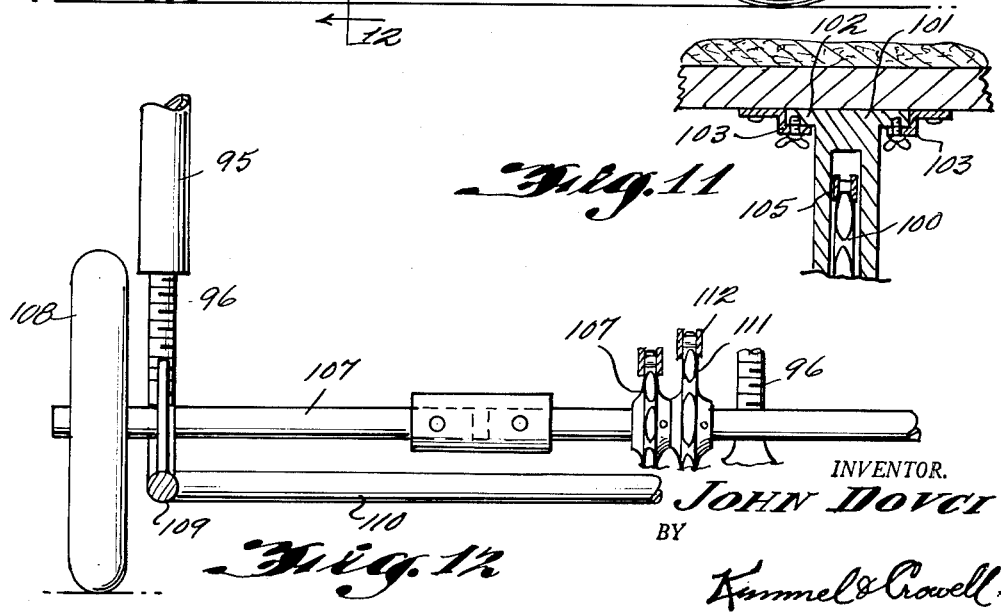
INVENTOR.
JOHN DOVCI
BY
Kummel & Crowell
ATTORNEYS United States Patent Office 3,042,131
Patented July 3, 1962

1

3,042,131
INVALID'S CART
John Dovci, Hazleton, Pa., by decree of distribution and assignment to Michael Dovci, Burnham, Pa.
Filed May 19, 1960, Ser. No. 30,188
1 Claim. (Cl. 180—27)

This invention relates to an invalid cart and more particularly to such a cart for the use of a paraplegic or an amputee.

The primary object of the invention is the provision of an improved cart of this character wherein the user's body is supported by the chest and abdominal muscles rather than by the buttocks, in order to relieve strain and tension on the buttocks and back muscles.

An additional object of the invention is the provision of such a device wherein the patient supported in prone position may actuate and propel the device by means of hand power, thereby exercising the arm and shoulder muscles.

An additional object of the invention is the provision of such a device whereby an amputee or paraplegic may propel himself from place to place, steering the appliance with a minimum of effort and difficulty.

Still another object of the invention is the provision of such a device wherein the relative angularity of the top or supporting surface may be varied at the will of the user, in order that it may be adjusted to the most comfortable position during use, that is preferably angled upwardly or forwardly, or alternatively, may be leveled off so that the user may be readily rolled onto a bed from the same, or off of a bed onto the device.

A more specific object of the invention is the provision of a device of this character wherein alternate manual and mechanical propulsive means are provided.

An additional object of the invention is the provision of such a device wherein the lifting of the supporting surface may be effected either hydraulically or mechanically.

Still another object of the invention is the provision of a device of this character which is sturdy and durable in construction, reliable and efficient in operation, and relatively simple and inexpensive to manufacture, assemble and utilize.

Still other objects reside in the combinations of elements, arrangements of parts, and features of construction, all as will be more fully pointed out hereinafter and shown in the accompanying drawings wherein there is disclosed the preferred embodiment of this inventive concept.

2

Figures 3, 4:
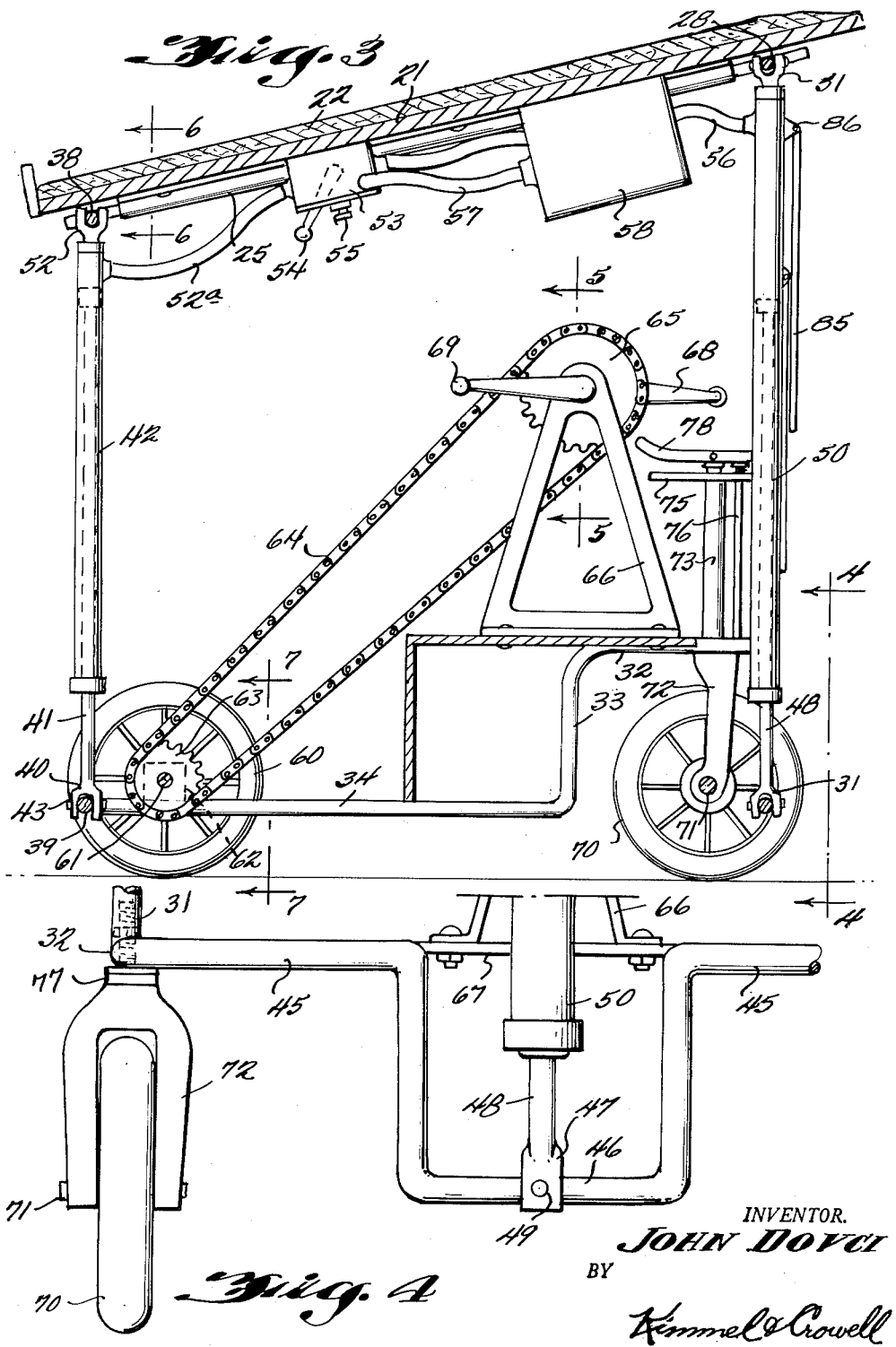
FIGURE 3 is an enlarged vertical sectional view taken substantially along the line 3—3 of FIG. 2 as viewed in the direction indicated by the arrows.
FIGURE 4 is an enlarged fragmentary sectional view taken substantially along the line 4—4 of FIG. 3 as viewed in the direction indicated by the arrows.

FIGURE 5 is an enlarged sectional view taken substantially along the line 5—5 of FIG. 3 as viewed in the direction indicated by the arrows.

FIGURE 6 is an enlarged sectional view taken substantially along the line 6—6 of FIG. 3 as viewed in the direction indicated by the arrows.

FIGURE 7 is an enlarged sectional view taken substantially along the line 7—7 of FIG. 3 as viewed in the direction indicated by the arrows.

FIGURE 8 is a fragmentary enlarged sectional view taken substantially along the line 8—8 of FIG. 3 as viewed in the direction indicated by the arrows.

FIGURE 9 is a sectional view taken substantially along the line 9—9 of FIG. 8 as viewed in the direction indicated by the arrows.

FIGURE 10 is a sectional view similar to FIG. 3 but showing a modified form of construction.

FIGURE 11 is a fragmentary sectional view taken substantially along the line 11—11 of FIG. 10 as viewed in the direction indicated by the arrows, and FIGURE 12 is an enlarged sectional view taken substantially along the line 12—12 of FIG. 10 as viewed in the direction indicated by the arrows.

Similar reference characters refer to similar parts throughout the several views of the drawing.

Figure 1:
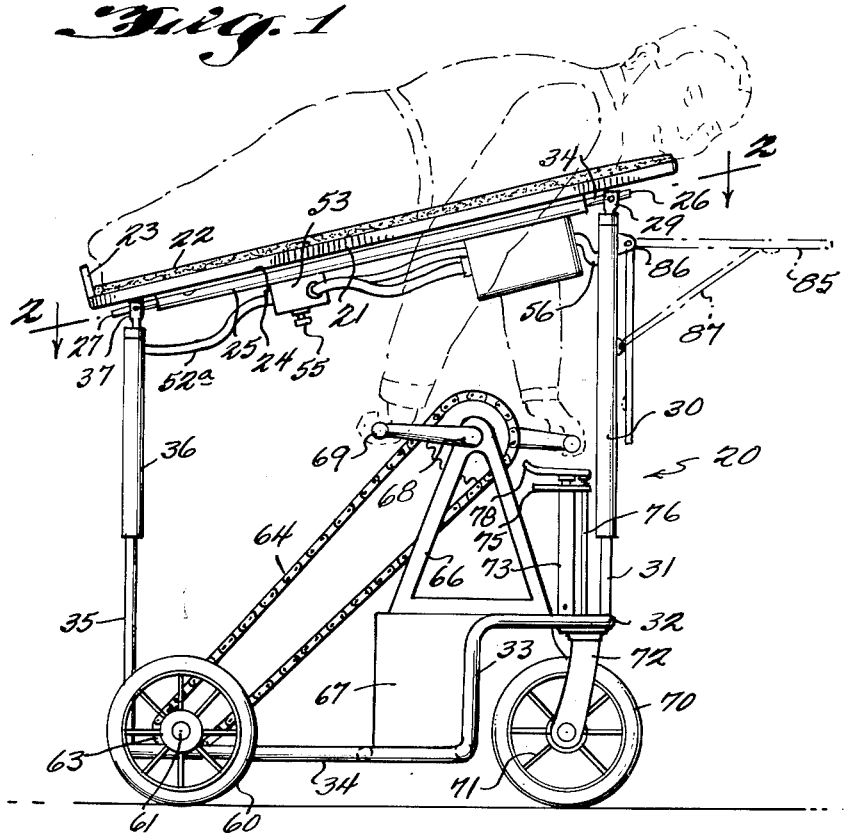
FIGURE 1 is a side elevational view of one form of the device of the instant invention shown in an operative position, the body of the user thereof being indicated in dotted lines.
Figure 2:
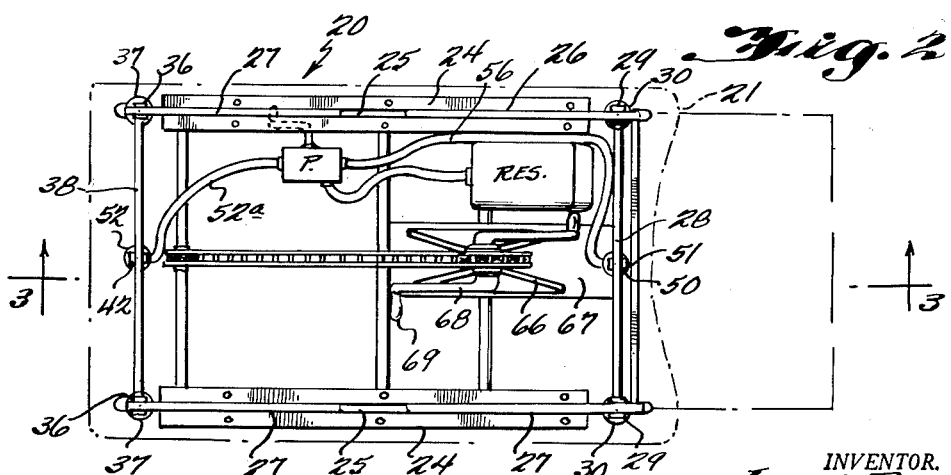
FIGURE 2 is a top plan view of the device of FIG. 1, with certain parts thereof removed in order to add clarity to the illustration.

Having reference now to the drawings in detail, and more particularly to the species of the invention disclosed in FIGS. 1 to 9, inclusive, the device of the instant invention, generally indicated at 20, includes a supporting surface or plate 21, which may if desired carry a pad or mattress 22 of foam rubber or other suitable material, upon which the body of the patient is adapted to be supported in prone position, by the chest and abdominal muscles, as indicated in FIG. 1. A rear support 23 carried by the plate 21 prevents slippage of the patient's body when the device is in the inclined position, as shown.

The underside of plate 21 has secured thereto a pair of longitudinally extending plates 24 on opposite sides, the plates being provided with a depending channel or groove 25, into the opposite ends of which extend front and rear rods 26 and 27, respectively, for a purpose to be more fully described hereinafter.

A transverse upper front support rod 28 connects the outer end of the forward rods 26, and is pivotally connected at its opposite ends to lugs 29 carried by the upper portions 30 of telescopic front support rods, the lower portions 31 of which are connected to lower front support members 32. The support members 32 are inclined downwardly as at 33, and extend rearwardly as at 34 to the rear of the frame. At their rear end supporting portions 34 carry uprights 35, which are telescopically engaged in cylinders or tubes 36, which in turn terminate in bifurcated members 37, which are pivotally connected to the rear ends of rear rods 27, the arrangement being such that the front and rear supporting rods may be telescoped independently, in a manner to be more fully described hereinafter.

A rear supporting rod 38 extends transversely between the upper extremities of tubular members 36. A lower transverse supporting rod 39 extends also between the extremities of the members 35, as best shown in FIG. 7, and has connected thereto as at 40 the lower end of a hydraulic piston 41, which is operable in a rear hydraulic cylinder 42, as best shown in FIG. 3. The fitting 40 is bifurcated, as best shown in FIG. 3 and is firmly secured to the rod 39 as by means of a transverse pin 43.

As best shown in FIG. 4, the forward supports 32 terminate in inwardly extending portions 45, which are provided centrally with a U-shaped depending bight portion 46 to which is secured the bifurcated end 47 of the front piston rod 48, a pin 49 serving firmly to secure the parts in related assembly. Piston rod 48 operates in a hydraulic cylinder 50 which extends upwardly, and terminates in a bifurcated member 51, which is in turn fixedly secured to transverse upper support member 28.

The upper end of hydraulic cylinder 42 is similarly secured by means of a bifurcated bracket 52 to rear transverse rod 38. A hydraulic conduit 53 leads from hydraulic cylinder 42 to a hand pump 53, of conventional design, which is provided with an operating handle 54 and a valve selector 55 which may direct fluid either through the conduit 52a to elevate the rear of the device by exerting pressure on the piston rod 41, or through a conduit 56 to front hydraulic cylinder 50 for elevating the forward end of the device. A third conduit 57 extends to the pump 53 from a forward reservoir 58, which is connected to the underside of plate 21, to which the pump assembly is also secured.

Obviously, an invalid lying on the plate 21 may reach under the plate to control the selector switch 55, and by operating the handle 54 may suitably elevate the front or rear of the apparatus to the desired height and inclination. The switch is so arranged, in conventional manner, that upon release of the fluid pressure the weight of the patient will return the device to normal level position.

The apparatus is supported on rear wheels 60, which are mounted on a transverse axle 61 which is journalled in lugs 62 carried adjacent the rear ends of the members 34. Axle 61 is provided centrally with a sprocket 63, which carries a chain 64, which in turn extends about a second sprocket 65. The sprocket 65 is mounted on an axle which is carried by a triangular supporting frame 66, which is in turn carried by a housing or support 67 substantially centrally mounted on the lower frame members 33, 34, and 22. Sprocket 65 is adapted to be rotated by means of a pair of opposed crank members 68 provided with handle grips 69 so positioned that the patient may readily reach them from his prone position on the pad 21.

The front wheels 70 are mounted on individual stub axles 71 carried by swivelable forks 72, which in-turn depend from the forward ends of supports 32 and 45.

Means are provided for steering one of the wheels 70, and hence the entire device, and take the form of a post 73 provided with an extension 74 which extends through bushings 74a in member 32 and is fixedly secured to one of the forks 72. The steering handle 75 is provided at the upper extremity of the post 73 in a position readily accessible to the operator of the apparatus. In order to control the straight line motion of the device a pin 76 extends through a suitable opening in one end of the operating handle 75, and locks in an aperture 77 in the end of member 32 which carries the forks 72. Pin 76 is controlled by means of a handle 78 which is pivotally mounted as on a pivot 79 on extension of upright 73, and which is normally biased by means of a spring 80 towards aperture engaging position. Compression of the handle 78 toward the handle 75 will serve to release the pin 76 to permit steering the apparatus.

From the foregoing the use and operation of the device should now be readily understandable. The paraplegic or invalid may position himself on the pad 22 supported by the plate 21, or may be positioned thereon by an attendant. He may then adjust the device himself to a suitable height, by means of a hand pump 53, or he may have the frame adjusted, control being effected by the selector knob 55.

Then by grasping the operating handles 69 he may propel himself while in a prone position to any desired location. Steering may be effected by means of the handles 75 and 78 as necessary, and in the absence of said steering the device will proceed in a straight line.

If desired, a worktray 85 may be pivotally mounted on lugs 86 carried by the members 30 in a position readily accessible to the patient, and supported in upright position by means of diagonal members 85 which lock the device in a conventional manner.

FIGS. 10, 11, and 12 disclose a modified form of construction wherein a pad 90 is supported on frame members 91, having extending end rods 92 similar to the previously described end rods 26 and 27, which are connected pivotally to brackets 93, the brackets in turn being fixed to screw threaded members 94 both at the front and rear of the device. Members 94 in turn are engaged by internally threaded sleeves 95, the lower portions of which engage upwardly extending threaded members 96, which are connected to the lower frame in the same manner as that of the previously described modification. The raising and the lowering of the device is thus effected by individually rotating the front and rear sleeves 95 to the desired extent.

In this device hand propulsion is effected by means of cranks 98 having hand grips 99, which are mounted on an axle carried by a sprocket 100 which in turn is carried by a depending mounting bracket 101, which is flanged at 102 to engage in clamps 103 carried by the underside of the plate 90. Sprocket 100 carries a chain 105, which in turn extends to a sprocket 106 mounted on an axle 107 at the rear of the device which carries wheels 108, the axle being mounted in a manner corresponding to the mounting of rear axle 61, and being carried by frame members 109 and 110 which correspond to the frame members 34 and 39.

In this modification of the device, however, an additional sprocket 111 is provided on the rear axle 107, and is engaged by a chain 112. The chain 112 extends to a sprocket 113, which is mounted on the drive shaft 114 of an electric motor 115, which is carried in a housing 116 supported by the lower frame, in a position similar to that of the previously described housing 67. Motor 115 is suitably powered by a storage battery 117, the arrangement being such that the device may thus be propelled either by the motor or by the hand crank as desired. The motor may be energized and de-energized in any conventional manner, as by a switch conveniently located on the underside of the plate 90. This device is steered by means of a steering assembly generally indicated at 118, which is identical to that of the previously described modification.

The operation of the device is also identical to that previously described, with the exception of the manipulation of the height as previously described, and the alternative power control.

From the foregoing it will now be seen that there is herein provided an improved cart for invalids, which accomplishes all the objects of this invention, and others, including many advantages of great practical utility and commercial importance.

As many embodiments may be made of this inventive concept, and as many modifications may be made in the embodiments hereinbefore shown and described, it is to be understood that all matter herein is to be interpreted merely as illustrative, and not in a limiting sense.

I claim:

A self-propelled invalid cart comprising a frame, an inclined support having a planar supporting surface for resting a patient thereon in a position of repose carried by said frame, telescopic upright members extending from the corners of said frame and supporting said inclined support, front and rear axles carried by said frame, wheels carried by said front axle, at least one of said wheels steerable, steering means supported on said frame and operatively connected to said steerable wheel, means to lock said steering means, non-steerable wheels carried by said rear axle, lifting means between the front and rear axles and the opposite ends of said inclined support, said lifting means individually operable to move either of the opposite ends of said support selectively, and drive means for said cart mounted on said frame, said steering means comprising a vertically extending shaft rotatably supported in said frame, one end of said shaft operatively secured to said steerable wheel, the free end of said shaft having a handle fixed thereto, a spring biased locking pin having one end normally residing in a detent in said frame to prevent rotation of said shaft, said locking pin extending vertically from said frame in spaced parallel relation to said rotatable shaft, the upper end of said locking pin secured to an operating lever, said operating lever pivotally secured to said rotatable shaft whereby pivotal movement thereof moves said locking pin against said spring bias out of said detent to allow said shaft to be rotated.

References Cited in the file of this patent

UNITED STATES PATENTS

| | | |
|---|---|---|
| 1,625,534 | Gardiner | Apr. 19, 1927 |
| 1,694,172 | Gallowitz | Dec. 4, 1928 |
| 1,761,233 | Roe | June 3, 1930 |
| 1,958,494 | Pehrsson | May 15, 1934 |
| 2,452,886 | Wood | Nov. 2, 1948 |
| 2,592,025 | Gray | Apr. 8, 1952 |
| 2,604,639 | Killifer | July 29, 1952 |
| 2,635,899 | Osbon | Apr. 21, 1953 |